April 16, 1935.  C. HUNGERFORD  1,998,279
FILTER
Filed March 30, 1934
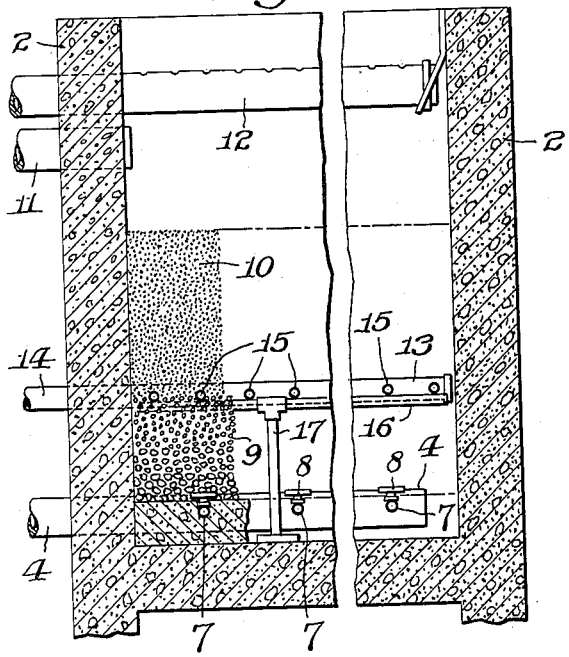
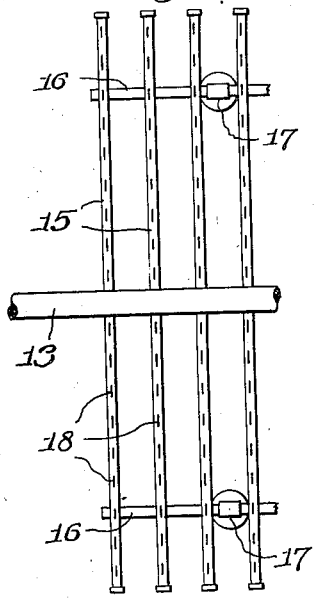
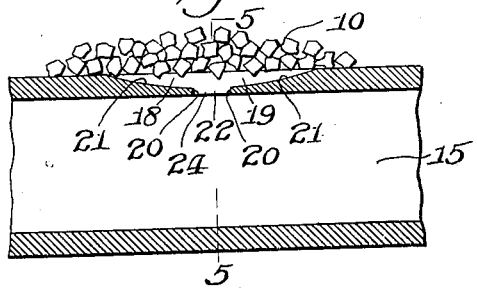
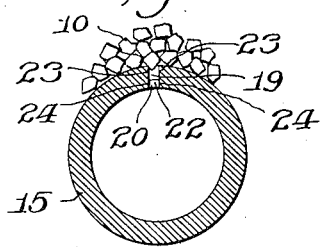
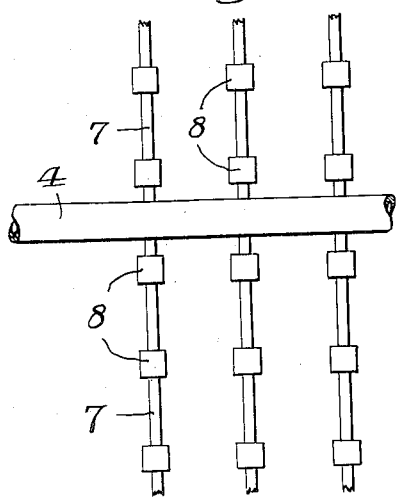
INVENTOR:
Churchill Hungerford
BY
A. Y. [signature]
ATTORNEY.

Patented Apr. 16, 1935

1,998,279

UNITED STATES PATENT OFFICE 1,998,279

FILTER

Churchill Hungerford, Clayton, N. J., assignor to Hungerford and Terry, Inc., Clayton, N. J., a corporation of Delaware Application March 30, 1934, Serial No. 718,158

7 Claims. (Cl. 210—130)

This invention relates to improvements in filters of the class in which water is filtered by passing it through a bed of sand.

In filters of this class, the bed of sand rests normally on a bed of gravel composed of superposed layers thereof wherein the gravel is gradually reduced in size from the bottom layer to the top layer; the filtering operation is effected by passing the water down through the sand and gravel beds; and the cleansing of the filter is effected by reversing the flow of water and causing it to pass upwardly through the sand and gravel beds at a speed much greater than the speed of the water during the filtering operation.

The method of cleansing the bed of sand has been defective because the reversal of the flow of water, no matter how fast, has not effected a complete cleansing of the sand grains, and, in consequence, there has been a gradual deterioration in the quality and quantity of the filtered water, and eventually the bed of sand becomes caked and sometimes cracks appear therein.

Efforts have been made to overcome the defects in the cleansing operation by the introduction of air to the upwardly flowing water at or below the bottom of the sand bed for the purpose of having the combined water and air rush up through the sand for the agitation and washing of the grains thereof. This introduction of the air has been accomplished by the employment of systems of pipes having a multiplicity of spaced air discharging openings or slots therein which were required to be of a definite size and character with relation to the size and character of the sand grains employed in filter beds to prevent the entrance of such sand grains into the pipes and to permit the proper discharge and distribution of the desired quantity of air, and by discharging air under pressure from such openings or slots. Such systems of pipes have been located at or below the bottom of the sand bed in contact with the grains thereof and they have also been located within the gravel bed beneath the sand bed. When the air discharging pipes of such systems were located within the gravel bed, the air and water together so disturbed the gravel during the cleansing operation, that thereafter the gravel bed failed properly to support the sand bed when the flow of water was reversed for filtering, and, consequently, sand passed into and through the gravel bed during the filtering operation. When the air discharging pipes of such systems were located at or near the bottom of the sand bed in contact therewith, it was impossible, heretofore, to preserve either a constant volume of air flowing through the openings or slots or a uniform distribution thereof, because such volume was governed and controlled, not by the size of the openings or slots in the pipes but by the extent to which the same were obstructed by sand grains which entered the slots and which became wedged therein, due to the irregular shapes thereof. The spaces or voids between the obstructing sand grains varied greatly with relation to the numerous openings or slots in the air discharging pipes, and such variations interfered seriously with the discharge of the desired volume of air and also with the desired distribution thereof.

An object of my invention is to provide the air discharging pipes of the filter with air discharging openings or passages of such novel and advantageous construction and in such novel relation to the sand grains of the filter bed that, when the pipes are located at or near the bottom of the sand bed in contact with the sand grains thereof, such openings or passages will control the volume and distribution of the air issuing from the pipes, irrespective of any blocking or partial obstruction of the passages which may occur, and thereby preserve a constant volume and distribution of the air at all times during successive washing or cleansing operations.

Other objects of the invention are to increase the life and efficiency of the instrumentalities employed in the cleansing operation, to lessen the time and quantity of water heretofore required for the washing or cleansing operation, to effect a more thorough washing or cleansing of the sand grains, and to gain other advantages in the operation of the filter, as will hereinafter appear.

The invention resides in the novel construction, combination and arrangement of elements hereinafter described and claimed.

In the accompanying drawing,

Figure 1 is a vertical section of a filter, partly broken away, illustrating my invention.

Figure 2 is a plan of the air pipe manifold and its laterally extending pipes, partly broken away.

Figure 3 is a plan of the water pipe manifold and its laterally extending pipes carrying the strainers, partly broken away.

Figure 4 is a longitudinal section through a portion of one of the air pipes showing one of the air discharging passages therein, constructed in accordance with my invention, and showing sand grains of the filter bed in association therewith.

Figure 5 is a transverse section, on line 5—5 of Fig. 4.

Referring to the drawing, 2 designates a filter tank which may be of any suitable shape and size for its intended purpose.

The lower portion of the tank 2 contains a water pipe manifold 4 having a multiplicity of smaller pipes 7 which project laterally from the respective sides thereof. The manifold 4 and its pipes 7 are embedded in a layer of concrete on the bottom wall of the tank forming the floor thereof. The pipes 7 are provided with sand valves or strainers 8 which project above the concrete floor of the tank. These strainers 8 are of usual and well known construction and they are provided to permit water to flow into and from within the pipes 7 and to prevent the entrance of sand into the same when water is flowing into the strainers. The valves or strainers 8 are properly distributed to collect water from all parts of the bottom of the tank, during the filtering operation, and to discharge water into all parts of the bottom of the tank, during the washing or cleansing operation.

One end of the water pipe manifold 4 extends outwardly from within the tank and it is adapted to be connected to the usual system of pipes and valves for permitting filtered water to flow therefrom into a suitable receiver, during the filtering operation, and for supplying water thereto from a suitable source, during the washing or cleansing operation.

The sand valves 8 are embedded in a layer of crushed stone which rests upon the floor of the tank, and resting upon the strainers and the crushed stone is a bed of gravel 9 consisting of a bottom layer of very coarse gravel and superposed layers of progressively finer gravel. The large voids in the layer of crushed stone in which the strainers 8 are embedded permit the free flow of water into and from within the strainers. The superposed layers of gravel are so graded as to fineness that each layer will rest upon the layer below it and support the layer above it; and the uppermost layer of gravel is sufficiently fine to properly support the filter bed of sand grains 10 which rests thereon.

The tank 2 is provided with a water supply pipe 11 which extends through a side wall thereof and discharges into the same above the filter bed 10 and through which the water to be filtered is supplied to the tank during the filtering operation.

Extending centrally through the upper portion of the tank 2 is the wash water collecting pipe 12 having a longitudinally extending row of perforations in the top wall thereof through which the wash water enters the pipe during the washing operation. This pipe 12 is suitably supported within the tank well above the filter bed 10 and one end thereof extends outwardly through a wall of the tank and is adapted to be connected to or form a continuation of another pipe leading to a suitable point of discharge for the wash water.

The construction and functions of the parts thus far described are common and well known in this art and no further description thereof is deemed necessary herein.

I shall now describe the air discharging pipes as constructed and related to the other parts of the filter in accordance with my invention.

Arranged at or near the bottom of the bed of sand grains 10 is a centrally arranged air pipe manifold 13 having a multiplicity of smaller pipes 15 which extend laterally from the respective sides thereof. The outer or free ends of the pipes 15 are closed and the opposite or inner ends thereof are threaded and screwed into the manifold 13 or otherwise suitably connected thereto in communication therewith. Manifold 13 and its pipes 15 are partially or wholly embedded in the bottom portion of the bed of sand grains 10.

The manifold 13 and its pipes 15 are supported by two pipes or rods 16 which extend parallel to the manifold 13 on the respective sides thereof beneath the pipes 15 and upon which the pipes 15 rest, the pipes or rods 16 being in turn supported by standards 17 which rise from and rest upon the bottom of the tank.

One end of the manifold 13 extends outwardly through a wall of the tank and is adapted to be connected to a suitable pressure blower or air compressor for delivering air at a low pressure to the pipes 15.

Each pipe 15 has formed in the wall thereof a longitudinally extending series of suitably located air discharging passages 18. Each passage comprises an outer discharging portion 19 and an inner air volume controlling orifice 22. The discharging portion 19 and the orifice 22 constitute the entire passage 18 leading from the interior to the exterior of the pipe. The total area of the cross section of the orifices 22 is less than the cross sectional area of the manifold 13.

The discharging portion 19 and the orifice 22 of each passage 18 are each elongated longitudinally of the pipe 15 in which they are formed. Each portion 19 is formed by oppositely disposed, parallel side walls 23 and upwardly and outwardly diverging end walls 21 connecting the side walls 23; and each orifice 22 is formed by oppositely disposed, parallel side walls 24 and suitable end walls 20 connecting them. The side walls 23 and 24 of each passage 18 form continuations of each other, and each entire passage 18 may be conveniently and inexpensively formed, first, by a milling operation which cuts the discharging portion 19 thereof between its side walls 23 and between its diverging end walls 21, and, subsequently, by a punching operation which forms the inner orifice 22.

The width of the discharging portion 19 of each passage 18 is less than the maximum diameter of the sand grains which, nevertheless, due to the irregular shapes thereof, enter the discharging portion of the passage to some extent and become wedged therein. Each passage 18 is possessed of the characteristics that the walls of the discharging portion 19 thereof prevent any of the sand grains from passing through the same to its orifice 22, and that the length of the discharging portion 19 and the cross sectional area thereof at the outer surface of its pipe is so much greater than the length and cross sectional area of the orifice 22 that the volume of air flowing through the entire passage 18 will be governed and controlled by the orifice 22, because any blocking or partial obstruction of the discharging portion 19 of the passage by any arrangement of sand grains which may become wedged therein will always leave voids or spaces between such grains which will equal or be in excess of the cross sectional area of the orifice 22, so that the orifice 22 governs and controls the volume of air discharged from the passage 18 and causes the same to remain substantially constant, irrespective of any relationship between the sand grains of the filter bed and the passage 18, which may occur.

Thus it will be seen that the walls of the discharging portions 19 of the passages 18 of all the pipes 15 form, in effect, a series of screens which prevent the sand grains from passing through the discharging portions 19 to the air volume controlling orifices 22, and which also prevent the diminution of the volume or quantity of air flowing through the orifices 22 by the sand grains which obstruct the passage.

The pipes 15 and their air discharging passages 18 are so distributed over the lower portion of the sand or filter bed that when the manifold 13 is connected to a pressure blower or air compressor for delivering air thereto at a certain low pressure, such air will be discharged into the sand bed 10 and the water flowing upwardly therethrough in such a substantially constant and uniform volume, and during the washing or cleansing of the filter, that the combination of air and water will thoroughly agitate the sand grains and effect a complete scouring and washing thereof.

During the washing operation the combined air and water which is forced up through the filter bed should be in the neighborhood of 9 to 10 gallons of water per square foot per minute, and from six to eight gallons of air per square foot per minute. This gives a total volume of fluid passing through the bed equal to fifteen to seventeen gallons per minute.

I have discovered that by providing the pipes 15 with the air discharging passages 18 and relating the same to the sand grains of the filter bed and to the cross sectional area of the air pipe manifold 13, as hereinbefore described, the air discharging pipes may be placed in the desired location at the bottom of the sand bed without danger of the air discharging passages becoming clogged with sand to any detrimental extent, that the desired quantity or volume of air may be discharged into the filter bed for thoroughly agitating and washing the sand grains without danger of disturbing the layers of gravel so that they will not properly perform their functions, that the volume of air discharged into the filter bed will remain constant for uniform effect upon the sand grains through many filter washing operations over a long period of time, that no caking or channeling of the filter bed will take place through long operation, and that the washing or cleansing operations may be effected with greater economy as to time and wash water used than heretofore has been possible in filters using a combination of air and water in the washing operation.

I claim:

1. In a combination with a filter bed consisting of sand grains, a pipe arranged to discharge air into said bed and to contact with the sand grains thereof; said pipe having an air discharging passage comprising an outer discharging portion and an inner air volume controlling orifice, said outer portion having means to prevent the sand grains from passing through the same to the orifice, and being sufficiently larger than the orifice to prevent any accumulation of sand grains from partially obstructing the same to an extent that will diminish the flow of air through the passage as controlled by the orifice.

2. In combination with a filter bed consisting of sand grains, a pipe arranged to discharge air into said bed and to contact with the sand grains thereof; said pipe having an air discharging passage comprising an outer elongated discharging portion and an inner elongated air volume controlling orifice shorter than said outer portion, the width of said outer portion being less than the diameter of the sand grains to prevent them from passing to the orifice, and the sand grains partially obstructing said outer portion having voids whose total effective area is at least equal to the cross sectional area of the orifice.

3. In combination with a filter bed consisting of sand grains, a pipe arranged to discharge air into said bed and to contact with the sand grains thereof; said pipe having an air discharging passage comprising an outer elongated discharging portion and an inner elongated air volume controlling orifice shorter than said outer portion, said outer portion having means to prevent the sand grains from passing through the same to the orifice, said outer portion and said orifice each having parallel side walls, and said outer portion having upwardly and outwardly diverging end walls.

4. In combination with a filter bed consisting of sand grains, a pipe arranged to discharge air into said bed and to contact with the sand grains thereof; said pipe having an air discharging passage comprising an outer elongated discharging portion and an inner elongated air volume controlling orifice shorter than said outer portion, said outer portion and said orifice each having parallel side walls, said outer portion having upwardly and outwardly diverging end walls, the width of said outer portion being less than the diameter of the sand grains to prevent them from passing to the orifice, and the sand grains partially obstructing the discharge of air from the passage having voids whose total effective area is at least equal to the cross sectional area of the orifice.

5. A filter pipe provided with an air discharging passage comprising an outer discharging portion and an inner air volume controlling orifice, the cross sectional area of said outer portion at the outer surface of the pipe being at least twice as great as the cross sectional area of the orifice, and said pipe having parts constructed to prevent sand grains from passing therethrough to the orifice.

6. A filter pipe provided with an air discharging passage comprising an outer elongated discharging portion and an inner elongated air volume controlling orifice of substantially the same width as said outer portion, the length of said outer portion being at least twice as great as the length of said orifice, the side walls of said outer portion being constructed to prevent sand grains from passing therethrough to the orifice.

7. A filter pipe provided with an air discharging passage comprising an outer elongated discharging portion and an inner elongated air volume controlling orifice of substantially the same width as said outer portion, the length of said outer portion being at least twice as great as the length of said orifice, said outer portion and said orifice each having parallel side walls and said outer portion having upwardly and outwardly diverging end walls, the side walls of said outer portion being constructed to prevent sand grains from passing therethrough to the orifice.

CHURCHILL HUNGERFORD.